(12) United States Patent
McGinn et al.

(10) Patent No.: US 6,262,972 B1
(45) Date of Patent: Jul. 17, 2001

(54) DIGITAL MULTITONE COMMUNICATION TRUNK

(75) Inventors: John D. McGinn, Brampton (CA); Paul K. Wong, Plano, TX (US); Oguz Ozkan, Brampton (CA)

(73) Assignee: Northern Telecom Limited, Montreal (CA)

(*) Notice: Subject to any disclaimer, the term of this patent is extended or adjusted under 35 U.S.C. 154(b) by 0 days.

(21) Appl. No.: 09/224,841

(22) Filed: Dec. 31, 1998

(51) Int. Cl.[7] .................................................. H04J 11/00
(52) U.S. Cl. .......................... 370/210; 370/359; 375/260
(58) Field of Search ................................... 370/537, 359, 370/203, 210; 375/260

(56) References Cited

U.S. PATENT DOCUMENTS 6,137,839 * 10/2000 Mannering et al. ................. 375/260
6,144,659 * 11/2000 Nye et al. ............................ 370/359

OTHER PUBLICATIONS

Warrier, Padmanand. "DSP Solutions for Voiceband and ADSL Modems," Application Report SPAA005. World Wide Broadband Access Group, Texas Instruments, Jun. 1998.*

* cited by examiner

Primary Examiner—Chau Nguyen
Assistant Examiner—D. Trinh
(74) Attorney, Agent, or Firm—Katten Muchin Zavis

(57) ABSTRACT

A digital communication trunk employing digital discrete multitone communication over twisted pair copper network segments to increase the effective bandwidth therethrough. Each central office includes an end unit to connect to the network segments and digital discrete multitone repeaters are employed throughout the trunk at defined distances to maintain signal quality. A multiplexer can be employed at the central offices to combine multiple baseband signals before transmission and to extract those multiple signals after reception. In one embodiment of the present invention, four T1 rate baseband signals are combined by the multiplexer into a single signal which is transmitted at T2 rates through the trunk.

9 Claims, 2 Drawing Sheets

US 6,262,972 B1

DIGITAL MULTITONE COMMUNICATION TRUNK

FIELD OF THE INVENTION

The present invention relates to digital communication trunks. More specifically, the present invention relates to a system and apparatus for increasing the effective communication bandwidth through such trunks.

BACKGROUND OF THE INVENTION

Several factors, including the wide adoption of the Internet and the convergence of various communication media have lead to a phenomenal growth in the amount communications bandwidth that is required in the world. While much effort is being expended at establishing new networks to provide the needed bandwidth, the cost of constructing such networks can be very high. Further, right of ways, cable paths or other physical requirements may not be readily available for deploying such new networks in some locations. Also, the costs of earlier, lower bandwidth networks may not yet have been fully recouped and a telecommunications carrier may thus have a strong economic disincentive to commence construction of a new network.

It is therefore desired to have a system and apparatus which can work with at least some part of an existing networking infrastructure but which can provide an increased effective bandwidth through the network.

SUMMARY OF THE INVENTION

It is an object of the present invention to provide a novel system and apparatus for providing an increase in effective bandwidth in a digital communication trunk.

According to a first aspect of the present invention, there is provided a digital communication trunk for transmitting digital data between two distal central offices each connected to a network segment by a digital discrete multitone end unit, comprising:

a digital interface to receive baseband digital information to be transmitted through said network segment;

a digital discrete multitone transmitter to receive said baseband digital information and to convert said baseband digital information into digital multitone information;

digital discrete multitone code to convert said digital multitone information into encoded analog information in a plurality of frequency bands;

a transmit line driver to convert said encoded analog information to predefined signal transmission levels for transmission on said network segment;

a receive line driver to amplify tone information received from said network segment to a predefined signal level;

a digital discrete multitone code to convert said encoded analog information from said receive line driver into digital multitone information; and a digital discrete multitone receiver to receive said digital multitone information and to form baseband digital information therefrom, said digital interface outputting said formed baseband digital information.

The present invention also provides, where two or more network segments of a digital trunk are employed to connect the central offices, a digital discrete multitone repeater unit to connect the network segments. The digital discrete multitone repeater unit includes a pair of repeater functions, each repeater function comprising:

a receive line driver to amplify encoded analog information received from a network segment to a predefined signal level;

a digital discrete multitone code to convert said encoded analog information to digital multitone information;

a digital discrete multitone receiver to receive said digital multitone information and to form baseband digital information therefrom;

a digital discrete multitone transmitter to receive said baseband digital information and to convert said baseband digital information into digital multitone information;

a digital discrete multitone codec to convert said digital multitone information into analog tone information; and a transmit line driver to convert said analog tone information to a predefined signal transmission level for transmission on another network segment.

The present invention allows telecommunication carriers to increase the effective bandwidth of existing digital communication trunk lines, such as T1 or E1 trunks, by replacing the repeaters in such trunks with digital discrete multitone repeaters and by providing each central office with a digital discrete multitone end unit. In one embodiment of the invention, the effective bandwidth of an existing T1 trunk can be increased fourfold, to T2 transmission rates, allowing T2 transmissions or four mutliplexed T1 transmissions to be achieved without requiring the replacement of T1 standard copper twisted pair infrastructure.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

One of the telecommunications standards for digital trunking of data is the T1 standard which provides bandwidth to transmit data at rates of 1.544 megabits per second (Mb/s). Another example of a digital trunking standard is the E1 standard, used mainly in Europe, which provides bandwidth to transmit 2.048 Mb/s. These and other digital trunk networks are widely used and are available throughout much of the industrialized world and the segments of such networks comprise twisted pair copper wiring.

Figure 1:
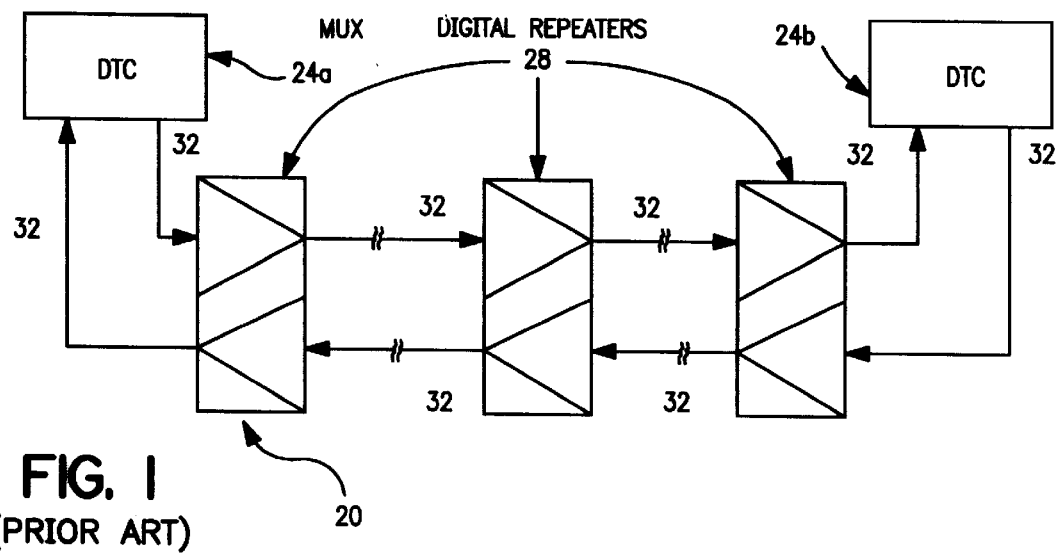
FIG. 1 shows a schematic representation of a prior art T1 digital trunk.

FIG. 1 shows a conventional T1 network 20 connecting digital trunk controllers 24a, 24b. For long haul T1 networks, the T1 standard requires that a digital repeater 28 be provided at least at every 6000 feet between network segments 32 to ensure that signal levels and characteristics are maintained along the network and other digital trunk standards have similar types of requirements. As used herein, the term segment is intended to comprise the run of cable/wire between a central office and a repeater or the run of cable/wire between pairs of repeaters.

A technique which is presently proposed to increase the effective bandwidth of existing subscriber networks is to employ discrete multitone modems to connect the telephone company central office to the subscriber premises with an Asynchronous Digital Subscriber Line (ADSL) system employing discrete multitone modems. These systems exploit the twisted pair copper lines between the central office and the subscriber premises and generally provide non-symmetric upstream and downstream channels, the latter of which can have a transmission speed exceeding one megabit per second (Mb/s). Such systems are generically know as xDSL systems and include ADSL, HDSL and other implementations. The present inventors have determined that the effective bandwidth through an existing twisted copper pair digital trunk network, such as a T1 network, can be significantly increased without requiring the replacement of existing network segments of twisted pair copper wires.

Specifically, the present inventors have determined that the conventional digital repeaters employed with such networks can be replaced with novel digital discrete multitone repeaters, described herein, at the same or greater spacings and a digital discrete multitone end unit placed in each central office to achieve a greater effective bandwidth. In an embodiment of the present invention which employs ADSL strategies, an effective bandwidth of at least 6.312 Mb/s can be achieved, which is the bandwidth of a T2 standard trunk. It is contemplated that even greater bandwidths can be achieved by employing some of the more aggressive strategies such as VDSL.

Figure 2:
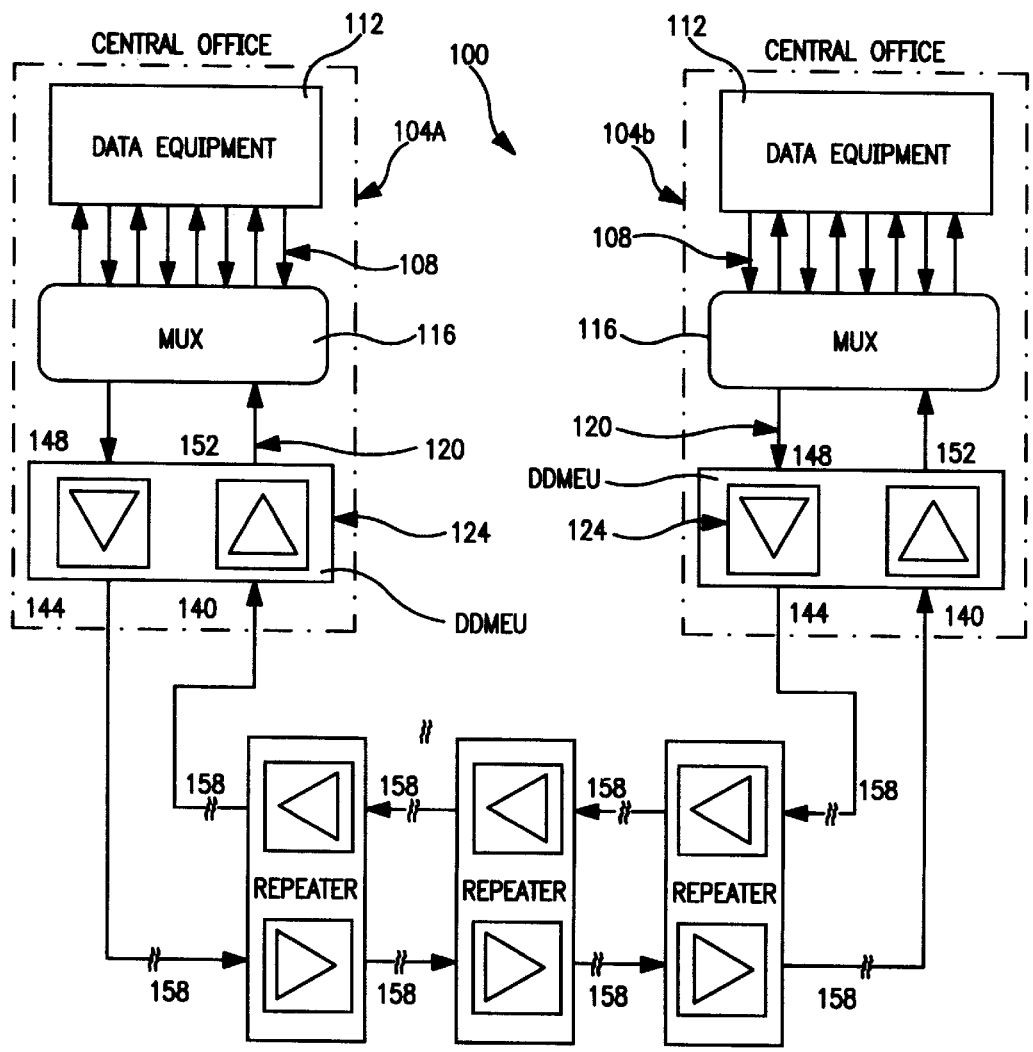
FIG. 2 shows a schematic representation of a digital discrete multitone communication trunk in accordance with the present invention.

FIG. 2 shows an embodiment of a digital communication trunk network 100, in accordance with the present invention. As shown, network 100 includes two central offices 104a, 104b each of which has four 1.544 Mb/s (i.e.—T1 rate) connections 108 for data equipment 112 through network 100. In this embodiment, connections 108 pass through a multiplexer 116 which converts the four connections to a 6.312 Mb/s T2-rate connection 120.

Figure 3:
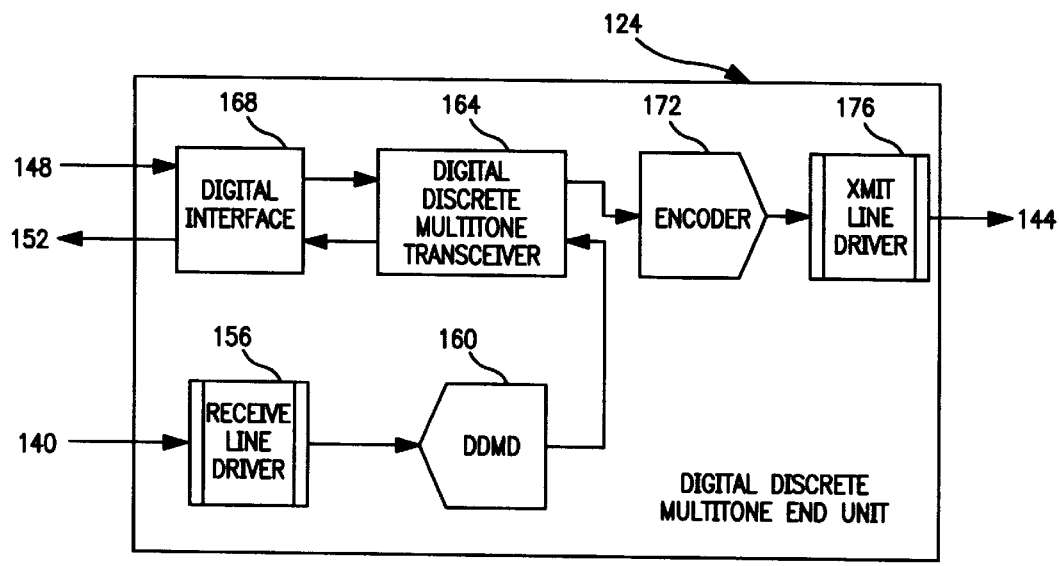
FIG. 3 shows a schematic representation of a digital discrete multitone end unit in accordance with the present invention for use in a central office.

Inputs and outputs of connection 120 are processed by a digital discrete multitone end unit (DDMEU) 124, which is shown in more detail in FIG. 3. DDMEU 124 includes a T2-rate digital discrete multitone modulated input 140, a T2-rate digital discrete multitone output 144, a T2 rate baseband digital input 148 and a T2 rate baseband digital output 152. Input 140 is connected to a receive line driver 156 which amplifies modulated signals received from network segments 158 to predefined signal levels. The output of receive line driver 156 is supplied to digital discrete multitone decoder 160 which performs an analog to digital conversion and various filtering functions. The filtered digital information from decoder 160 is provided to a digital discrete multitone transceiver 164 which converts the digital information into T2 rate baseband information sent to output 152 via a digital interface 168.

T2 rate baseband information supplied to DDMEU 124 at input 148 is provided to digital discrete multitone transceiver 164 via digital interface 168. Transceiver 164 converts the baseband digital information to digital information for encoding by an encoder 172 to analog multi-frequency band tone information. The tone information output from encoder 172 is provided to a transmit line driver 176 which boosts the modulated signal levels to predefined levels for transmission through a network 158 via output 144.

In a presently preferred embodiment of the invention, DDMEU 124 is implemented with the TNETD2000 series chipset for ADSL communications, available from Texas Instruments. Reference Sheets and other information on this chipset are available from a variety of sources, including the document "DSP Solutions for Voiceband and ADSL Modems", the contents of which are incorporated herein by reference, When implemented with this chipset, receive line driver 156 and transmit line driver 176 are implemented in the THS6002 chip, decoder 160 and encoder 172 are implemented in the TNETD2011 chip, transceiver 164 is implemented in the TNETD2200 chip and digital interface 168 is implemented in the TNETD2100 chip. In this particular implementation, only the 8 Mb/s downstream portion of the chipset is employed and the TNETD2100 and TNETD2200 chips are operated in full-rate multi-line mode. The proper implementation and use of this chipset will be apparent to those of skill in the art, and will not be further discussed herein. As will also be apparent to those of skill in the art, the present invention is not limited to implementation with this chipset and can be implemented in a variety of manners, as will occur to those of skill in the art. Further, the present invention is not limited to ADSL-based implementations and any xDSL or similar scheme employing digital discrete multitone communications can be employed. In particular, the bandwidth allocation between upstream and downstream channels can be varied, with the upstream channel being very small and used for control or signaling purposes, or even omitted entirely.

Modulated input 140 and modulated output 144 are connected to a network segment 158, such as an existing T1 standard copper twisted pair. Each end of a segment 158 is connected to an DDMEU 124 or an digital discrete multitone repeater 204, which is shown in more detail in FIG. 4.

Figure 4:
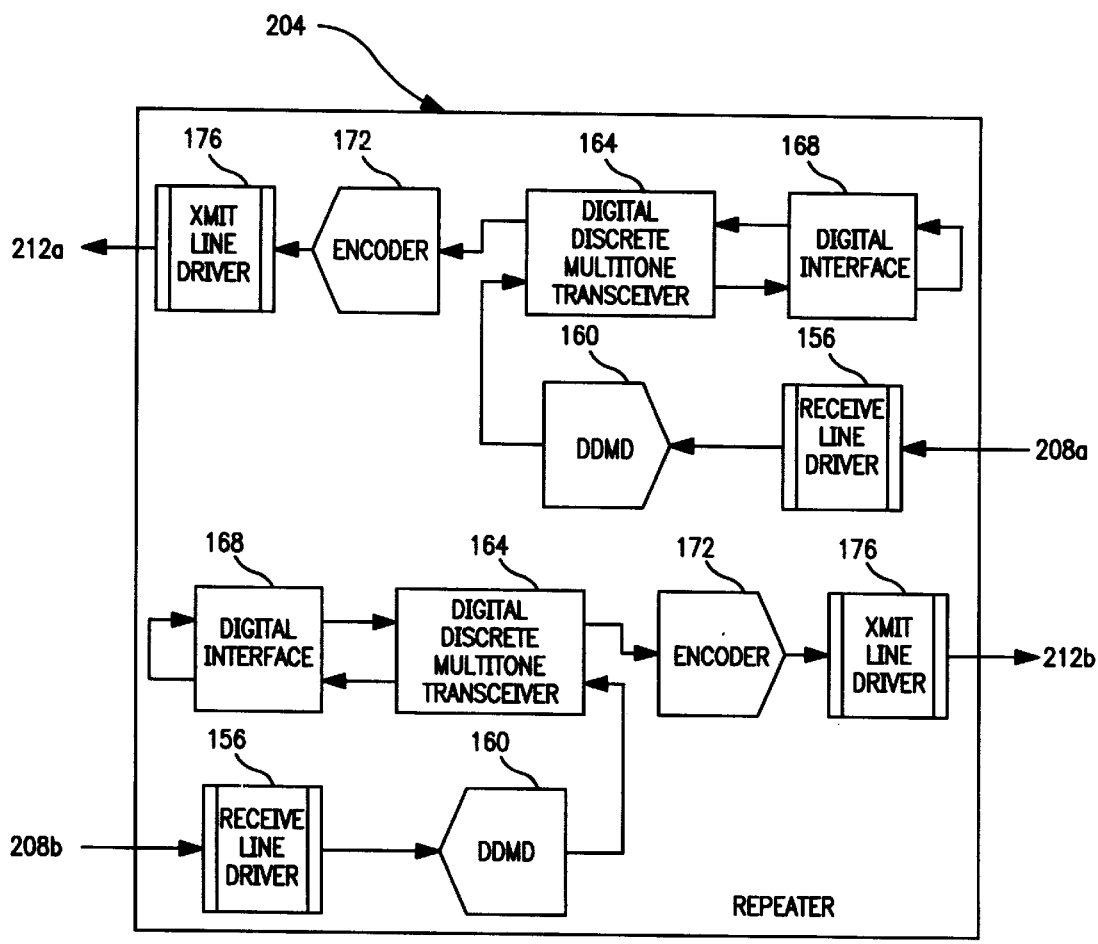
FIG. 4 shows a schematic representation of a digital discrete multitone repeater in accordance with the present invention.

As shown in FIG. 4, repeater 204 includes two repeater functions, each of which is similar to DDMEU 124, with the exception that no baseband input or output need be provided at repeater 204 and that modulated communications received at repeater 204 are retransmitted as modulated communications. In fact, in a presently preferred embodiment of the invention, repeater 204 is essentially implemented as a pair of DDMEUs 124 with their respective baseband outputs 148 applied directly to their respective baseband inputs 152. A modulated signal applied to input 208a is therefore repeated at modulated output 212a and a modulated signal applied to input 208b is repeated at modulated output 212b.

As will be apparent to those of skill in the art, network 100 is not limited to use with four baseband T1 lines. For example, mutiplexer 116 can be omitted and a baseband T2 signal can be applied directly to DDMEU 124 at each central office. Similarly, other data channels and digital trunks, such as E1, with different data transmission rates can be multiplexed together to transmit a variety of data through network 100 at T2 data rates or higher.

The present invention allows telecommunications provides to increase the effective bandwidth of existing twisted pair copper digital communication trunk lines, such as T1 and E1 trunks, by replacing the repeaters in such trunks with digital discrete multitone repeaters and by providing each central office with a digital discrete multitone end unit. In one embodiment of the invention, the effective bandwidth of an existing T1 trunk can be increased fourfold, to T2 transmission rates, allowing T2 transmissions or four mutliplexed T1 transmissions to be achieved without requiring the replacement of T1 standard copper twisted pair segments.

The above-described embodiments of the invention are intended to be examples of the present invention and alterations and modifications may be effected thereto, by those of skill in the art, without departing from the scope of the invention which is defined solely by the claims appended hereto.

We claim:

1. A digital communication trunk for transmitting digital data between two distal central offices, comprising:

at least one network segment connected to another network segment by a digital discrete multitone repeater, each said repeater including a pair of repeater functions, each repeater function including: (a) a receive line driver to amplify encoded analog information received from a network segment to a predefined signal level; (b) a digital discrete multitone codec to convert said encoded analog information to digital multitone information; (c) a digital discrete multitone receiver to receive said digital multitone information and to form baseband digital information therefrom; (d) a digital discrete multitone transmitter to receive said baseband digital information and to convert said baseband digital information into digital multitone information; (e) a digital discrete multitone codec to convert said digital multitone information into analog tone information; and (f) a transmit line driver to convert said analog tone information to a predefined signal transmission level for transmission on another network segment;

at least two distal central offices, each distal central office connected to a respective one of said at least two network segments, each distal central office including: (g) a digital interface to receive baseband digital information to be transmitted through said network segment; (h) a digital discrete multitone transmitter to receive said baseband digital information and to convert said baseband digital information into digital multitone information; (i) a digital discrete multitone codec to convert said digital multitone information into encoded analog information in a plurality of frequency bands; (j) a transmit line driver to convert said encoded analog information to predefined signal transmission levels for transmission on said network segment; (k) a receive line driver to amplify tone information received from said network segment to a predefined signal level; (l) a digital discrete multitone codec to convert said encoded analog information from said receive line driver into digital multitone information; and (m) a digital discrete multitone receiver to receive said digital multitone information and to form baseband digital information therefrom, said digital interface outputting said formed baseband digital information.

2. A digital communication trunk according to claim 1 comprising a digital discrete multitone transceiver which functions as both said digital discrete multitone transmitter and said digital discrete multitone receiver.

3. A digital communication trunk according to claim 1 wherein each network segment comprises a copper twisted pair.

4. A digital communication trunk according to claim 3 wherein said copper twisted pair complies with requirements for T1 standard trunks and each distal central office further comprises a multiplexer to convert a first set of four baseband T1 digital signals to a first single baseband T2 digital signal and to convert a second single baseband T2 digital signal to a second set of four baseband T1 digital signals, said multiplexer operable to provide said first T2 digital baseband signal to said digital discrete multitone transmitter and receive said second T2 digital baseband signal from said digital discrete multitone receiver and to provide said second set of four T1 baseband digital signals.

5. A digital communication trunk according to claim 3 wherein said each distal central office further comprises a multiplexer operable to combine a first set of digital baseband signals at a first transmission rate into a second digital baseband signal at a higher transmission rate and to provide said second higher rate digital baseband signal to said digital discrete multitone transmitter, said multiplexer further operable to receive a third digital baseband signal at said higher transmission rate from said digital discrete multitone receiver and to divide said third rate digital baseband signal into a fourth set of digital baseband signals at said first transmission rate.

6. A digital communications trunk according to claim 1 wherein each segment includes both a downstream and upstream channel and the bandwidth allocation of said channels is asymmetric.

7. A digital communication trunk for transmitting digital data between two distal central offices each connected to a network segment by a digital discrete multitone end unit, comprising:

a digital interface to receive baseband digital information to be transmitted through said network segment;

a digital discrete multitone transmitter to receive said baseband digital information and to convert said baseband digital information into digital multitone information;

a digital discrete multitone codec to convert said digital multitone information into encoded analog information in a plurality of frequency bands;

a transmit line driver to convert said encoded analog information to predefined signal transmission levels for transmission on said network segment;

a receive line driver to amplify tone information received from said network segment to a predefined signal level;

a digital discrete multitone codec to convert said encoded analog information from said receive line driver into digital multitone information; and a digital discrete multitone receiver to receive said digital multitone information and to form baseband digital information therefrom, said digital interface outputting said formed baseband digital information.

8. The digital communication trunk as claimed in claim 7 wherein said central offices are connected by at least two network segments, each network segment being connected at least one end to a pair of repeater functions, one in each direction, in a digital discrete multitone repeater, each repeater function comprising:

a receive line driver to amplify encoded analog information received from a network segment to a predefined signal level;

a digital discrete multitone codec to convert said encoded analog information to digital multitone information;

digital discrete multitone receiver to receive said digital multitone information and to form baseband digital information therefrom;

a digital discrete multitone transmitter to receive said baseband digital information and to convert said baseband digital information into digital multitone information;

a digital discrete multitone codec to convert said digital multitone information into analog tone information; and a transmit line driver to convert said analog tone information to a predefined signal transmission level for transmission on another network segment.

9. A digital communications trunk according to claim 8 wherein each segment includes both a downstream and upstream channel and the bandwidth allocation of said channels is asymmetric.

* * * * *

UNITED STATES PATENT AND TRADEMARK OFFICE
CERTIFICATE OF CORRECTION

PATENT NO. : 6,262,972 B1  Page 1 of 1
DATED : July 17, 2001
INVENTOR(S) : John D. McGinn et al.

It is certified that error appears in the above-identified patent and that said Letters Patent is hereby corrected as shown below:

<u>Title page,</u>
Item [73], Assignee, "Northern Telecom Limited, Montreal (CA)" should read
-- Nortel Networks Limited, Richardson, TX (US) --.

Signed and Sealed this

Twenty-second Day of October, 2002

Attest:

Attesting Officer

JAMES E. ROGAN
*Director of the United States Patent and Trademark Office*